US012566877B2

(12) United States Patent
Wang et al.

(10) Patent No.: US 12,566,877 B2
(45) Date of Patent: Mar. 3, 2026

(54) PRIVACY SECURE BATCH RETRIEVAL USING PRIVATE INFORMATION RETRIEVAL AND SECURE MULTI-PARTY COMPUTATION

(71) Applicant: GOOGLE LLC, Mountain View, CA (US)

(72) Inventors: Gang Wang, Mountain View, CA (US); Marcel M. Moti Yung, Mountain View, CA (US); Kevin Wei Li Yeo, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/286,838

(22) PCT Filed: May 2, 2023

(86) PCT No.: PCT/US2023/020693
§ 371 (c)(1),
(2) Date: Oct. 13, 2023

(87) PCT Pub. No.: WO2023/215290
PCT Pub. Date: Nov. 9, 2023

(65) Prior Publication Data
US 2025/0131115 A1 Apr. 24, 2025

(30) Foreign Application Priority Data

May 3, 2022 (IL) .......................................... 292731

(51) Int. Cl.
*G06F 21/62* (2013.01)
*H04L 9/08* (2006.01)

(52) U.S. Cl.
CPC .......... *G06F 21/6218* (2013.01); *H04L 9/085* (2013.01)

(58) Field of Classification Search
CPC .. H04N 5/765; H04N 21/4221; H04N 5/4403; H04N 21/4126; H04N 21/42228;
(Continued)

(56) References Cited

U.S. PATENT DOCUMENTS

| | | | | | |
|---|---|---|---|---|---|
| 2004/0240446 | A1* | 12/2004 | Compton | ......... | H04N 21/64322 370/252 |
| 2005/0015511 | A1* | 1/2005 | Izmailov | ................. | H04L 45/12 709/238 |

(Continued)

FOREIGN PATENT DOCUMENTS

EP 3483866 B1 12/2020

OTHER PUBLICATIONS

Office Action in Israel Appln. No. 292731, mailed on Jun. 18, 2024, 3 pages.
(Continued)

*Primary Examiner* — Sharif E Ullah
(74) *Attorney, Agent, or Firm* — Fish & Richardson P.C.

(57) ABSTRACT

Methods, systems, and apparatus, including computer programs encoded on a computer storage medium, for batch retrieving data are described. In one aspect, a method includes receiving, from a client device and by a first multi-party computation (MPC) server of a cluster of MPC servers, a batch request for retrieving multiple database values stored in one or more databases. The batch request includes a first byte array that includes, for each requested key of multiple requested keys, a first secret share of the requested key. Each database includes multiple data items that each include a database key and a corresponding value. The MPC server processes each database key to generate first secret shares of matching data indicating whether the database key matches at least one requested key. The MPC server generates one or more results that represent database
(Continued)

100 values corresponding to each database key that matches at least one requested key.

20 Claims, 4 Drawing Sheets

(58) Field of Classification Search
CPC ....... H04N 21/43615; H04N 21/44227; H04N 21/485; H04L 65/4076; H04L 65/608; H04L 65/80; H04L 45/00; H04L 29/06; H04L 29/06027; H04L 45/16; H04L 63/123; H04L 67/06; G06F 13/28; G06F 3/0685; G06F 3/0626; G06F 3/0658; G06F 3/0688; G06F 11/1076; G06F 12/0246; G06F 13/16; G06F 21/6218; H04W 4/06; H04W 72/005; H04W 28/06; H04W 48/10; H04W 48/12; H04W 4/08; H04W 12/06; H04W 12/12
USPC ............ 726/2, 4, 21, 36; 713/150, 163, 181; 380/255, 264, 276
See application file for complete search history.

(56) References Cited

U.S. PATENT DOCUMENTS

| | | | |
|---|---|---|---|
| 2005/0195823 A1* | 9/2005 | Chen ......................... | H04L 7/02 370/432 |
| 2011/0107408 A1* | 5/2011 | Blot-Lefevre .......... | H04L 63/12 726/7 |
| 2011/0145528 A1* | 6/2011 | Watanabe ........... | G06F 11/1456 711/E12.103 |
| 2012/0192261 A1* | 7/2012 | Blot-Levevre ........ | H04L 67/141 726/10 |
| 2023/0060420 A1* | 3/2023 | Le Van Gong ......... | H04L 9/085 |
| 2025/0131115 A1* | 4/2025 | Wang ...................... | H04L 9/085 |

OTHER PUBLICATIONS

International Preliminary Report on Patentability in International Appln. No. PCT/US2023/020693, mailed on Nov. 14, 2024, 10 pages.
Angel et al., "PIR with compressed queries and amortized query processing," 2018 IEEE symposium on security and privacy (SP). IEEE, May 2018, 18 pages.
Boyle et al., "Function secret sharing: Improvements and extensions," Proceedings of the 2016 ACM SIGSAC Conference on Computer and Communications Security, Oct. 2016, pp. 1292-1303.
Github.com [online], "dovekey_auction_secure_2pc.md," Mar. 2021, retrieved on Mar. 23, 2023, retrieved from URL <https://github.com/google/ads-privacy/blob/master/proposals/dovekey/dovekey_auction_secure_2pc.md>, 18 pages.
Github.com [online], "dpf-cpp," Jan. 2018, retrieved on Mar. 23, 2023, retrieved from URL <https://github.com/dkales/dpf-cpp>, 2 pages.
Github.com [online], "First Experiment (Fledge)," Jan. 2021, retrieved on Mar. 23, 2023, retrieved from URL <https://github.com/WICG/turtledove/blob/main/FLEDGE.md>, 64 pages.
Github.com [online], "Similar Cohort Audiences Upholding Privacy," Nov. 2020, retrieved on Mar. 23, 2023, retrieved from URL <https://github.com/google/ads-privacy/tree/master/proposals/scaup>, 11 pages.
International Search Report and Written Opinion in Appln. No. PCT/US2023/020693, mailed on Jul. 10, 2023, 13 pages.
Jarecki et al., "3PC ORAM with low latency, low bandwidth, and fast batch retrieval," International association for cryptologic research, Apr. 14, 2018, 45 pages.
Kim et al., "Privacy-preserving kNN query processing algorithms via secure two-party computation over encrypted database in cloud computing," The Journal of Supercomputing, Jan. 17, 2022, 78(7):9245-9284.
Pinkas et al., "Efficient circuit-based PSI with linear communication," Advances in Cryptology—Eurocrypt 2019: 38th Annual International Conference on the Theory and Applications of Cryptographic Techniques, Darmstadt, Germany, Proceedings, Part III 38, May 19-23, 2019, 30 pages.
Wikipedia.org [online], "Base64," Apr. 2003, retrieved on Mar. 23, 2023, retrieved from URL <https://en.wikipedia.org/wiki/Base64>, 8 pages.
Wikipedia.org [online], "Cuckoo filter," Nov. 2018, retrieved on Mar. 23, 2023, retrieved from URL <https://en.wikipedia.org/wiki/Cuckoo_filter>, 2 pages.
Wikipedia.org [online], "Distributed point function," Oct. 2017, retrieved on Mar. 23, 2023, retrieved from URL <https://en.wikipedia.org/wiki/Distributed_point_function>, 1 page.
Wikipedia.org [online], "Perfect hash function," Jul. 2003, retrieved on Mar. 23, 2023, retrieved from URL <https://en.wikipedia.org/wiki/Perfect_hash_function>, 7 pages.
Wikipedia.org [online], "Private information retrieval," Nov. 2004, retrieved on Mar. 23, 2023, retrieved from URL <https://en.wikipedia.org/wiki/Private_information_retrieval>, 6 pages.
Zhou et al., "Efficient k-NN query over encrypted data in cloud with limited key-disclosure and offline data owner," Computers & Security, Dec. 2, 2016, 69:84-96.
Office Action in Indian Appln. No. 202327069071, mailed on Nov. 19, 2025, 9 pages (with English translation).

* cited by examiner

200

| Application 112 | MPC1 132A | MPC2 132B | Data Provider 150 |
|---|---|---|---|

Provide database 202

Provide database 204

Determine to obtain values for keys 206

Determine to generate batch request 208

Encode keys into request byte array(s) 210

Split byte array(s) into shares 212

Send batch request 214

Process request(s) 216

Send garbled response 218

Send response(s) representing values of requested keys 220

Assemble actual response 222

Convert actual response 224

Perform action based on actual response 226

310 Receive a batch request

320 Process batch request

330 Generate result(s)

340 Send result(s) to client device

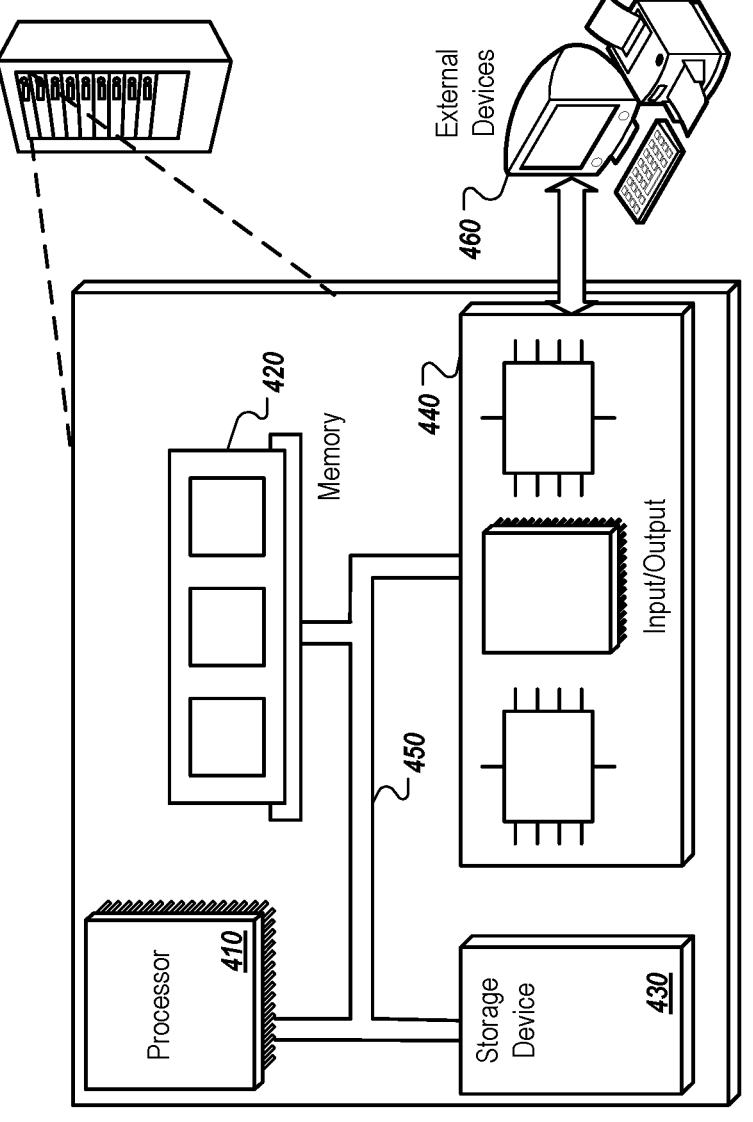
FIG. 4

PRIVACY SECURE BATCH RETRIEVAL USING PRIVATE INFORMATION RETRIEVAL AND SECURE MULTI-PARTY COMPUTATION

CROSS-REFERENCE TO RELATED APPLICATIONS

This application is a National Stage Application under 35 U.S.C. § 371 and claims the benefit of International Application No. PCT/US2023/020693 filed May 2, 2023, which claims the benefit of priority to Israeli Application Serial No. 292731, filed May 3, 2022, the disclosures of which are is incorporated herein by reference.

TECHNICAL FIELD

This specification is related to cryptography, data privacy, and data security.

BACKGROUND

Private information retrieval is a family of protocols that enables the retrieval of an item from a database hosted by a server without revealing to the server which item is being retrieved. Secure multi-party computation (MPC) is a family of cryptographic protocols that prevents access to data by distributing computations across multiple parties such that no individual party can access another party's data or intermediate computed values, while outputs are released only to designated parties. The MPC computing systems typically perform the computations using secret shares or other encrypted forms of the data and secure exchange of information between the parties.

SUMMARY

In general, one innovative aspect of the subject matter described in this specification can be embodied in methods including the operations of receiving, from a client device and by a first multi-party computation (MPC) server of a cluster of MPC servers, a batch request for retrieving multiple database values stored in one or more databases, the batch request including a first byte array that includes, for each requested key of multiple requested keys, a first secret share of the requested key, wherein each database includes multiple data items that each include a database key and a corresponding value; processing, by the first MPC server, each database key to generate first secret shares of matching data indicating whether the database key matches at least one requested key of the multiple requested keys; generating, by the first MPC server using each first secret share of the matching data for each database key, one or more results that represent database values corresponding to each database key that matches at least one requested key of the multiple requested keys; and sending the one or more results to the client device. Other implementations of this aspect include corresponding apparatus, systems, and computer programs, configured to perform the aspects of the methods, encoded on computer storage devices.

These and other implementations can each optionally include one or more of the following features. In some aspects, a second MPC server of the MPC cluster receives a second byte array that includes, for each requested key of the multiple requested keys, a second secret share of the requested key. The first MPC server and the second MPC server cam collaboratively perform secure MPC operations to generate the one or more results that represent the database values corresponding to each database key that matches the at least one requested key and one or more additional results that represent the database values corresponding to each database key that matches the at least one requested key. The second MPC server sends the one or more additional results to the client device.

In some aspects, the first secret share of each requested key includes a first distributed point function key generated by the client device using a generation function of a distributed point function. The second secret share of each requested key can include a second distributed point function key generated by the client device using the generation function of the distributed point function.

In some aspects, processing, by the first MPC server, each database key to generate first secret shares of matching data indicating whether the database key matches at least one requested key of the plurality of requested keys includes, for each database key, identifying each potential location for the database key in the first byte array, and, for each potential location, determining a respective first secret share of the matching data using an evaluation function of the distributed point function.

In some aspects, generating, by the first MPC server using each first secret share of the matching data for each database key, one or more results that represent database values corresponding to each database key that matches at least one requested key of the multiple requested keys includes, for each potential location for each database key, determining whether the respective first secret share of the matching data has a value of one, and, in response to determining that the respective first secret share of the matching data has a value of one, determining, as a first secret share of a database value for the potential location, a result of an XOR operation between the respective first secret share of the matching data and an existing value in the potential location of the first byte array.

In some aspects, generating the one or more results includes generating a first result that includes a first result byte array that includes, for each requested key of the plurality of requested keys that exists in the database, a corresponding byte array that represents a value for the requested key. The first result can include, for each requested key of the plurality of requested keys that is not found in the database, a value of zero.

Generating the one or more results can include receiving, from the second MPC server, a garbled response that represents a result of a bitwise XOR operation performed on a second result byte array and a mask. The second result byte array can include, for each requested key of the plurality of requested keys, a corresponding byte array that represents a value for the requested key. Generating the one or more results can include computing a bitwise XOR operation on the first result byte array and the garbled response. The mask can be generated by the client device and the first MPC server using a cryptographic algorithm and an input nonce for each location in the first byte array.

Particular embodiments of the subject matter described in this specification can be implemented so as to realize one or more of the following advantages. The systems and techniques described in this document enable a client device (e.g., an application running on the client device) to batch retrieve multiple data items from databases hosted by servers while preventing the servers from having access to the data items requested by the client device and/or the data items returned to the client device. The databases can store items in the form of key-value pairs that each include a key that identifies the data item and a value of the data item. In this example, the client device can request values for a set of keys and the servers can provide the values corresponding to the keys without the servers being able to access the requested keys or the values of the data items returned to the client device. This improves data security and data privacy in situations in which the keys and/or values of the data items include confidential information and in situations in which the fact that the client device requests a set of keys is confidential information.

The systems and techniques described in this document can combine private information retrieval (PIR) techniques with probabilistic data structures (e.g., cuckoo filters), MPC techniques, and distributed point functions or other forms of secret sharing that provides a synergistic effect of preserving data security and data privacy while also improving the speed and efficiency of obtaining the data items from the servers relative to other techniques, e.g., batch retrieval techniques that employ a single PIR server using homomorphic encryption. For example, the techniques for returning values of data items that are requested by a client device using these described techniques are less computationally expensive, e.g., requires fewer processor cycles per requested data item and/or less network bandwidth, than single server PIR techniques.

The described techniques also prevent the servers from being able to identify the quantity of data items requested by the client device, or returned to the client device by servers, which provides additional privacy guarantees, e.g., in situations in which the quantity of requested/returned data items is confidential information. To further enhance such data privacy, the client device can be configured to select from multiple probabilistic data structure sizes and randomly pick one to prevent MPC from knowing the number of keys in a request.

Using the described batch retrieval techniques also reduces the number of requests sent by client devices over a data communication network that connects the client devices to the servers and the number of responses sent from the servers to the client devices. Aggregated over thousands or millions of client devices, this results in substantial bandwidth and latency savings. The reduced data size enabled by the described batch retrieval techniques also reduces the amount of battery power consumed by client devices to send requests and receive responsive data, which is important for mobile devices that often run on limited battery power. The batch retrieval techniques provide these performance improvements even for large quantities of requested data items as the overall latency, computational requirements, and bandwidth is the same or similar regardless of the quantity of data items requested.

In some implementations, the client device (e.g., the application running on the client device) can selectively use the batch retrieval techniques depending on the quantity of data items that the client device is requesting. In this way, when only a few data items are being requested, the client device can use a more efficient single item PIR process, thereby reducing the computational burden placed on the servers and freeing up the servers to handle batch retrieval requests received from other client devices. This increases the quantity of requests that can be handled by the servers at any given time.

Using key encoding techniques described in this document enables the servers to scan an entire database once, independent of the quantity of data items being requested. This reduces the computational burden, e.g., the quantity of processor cycles required to return the values of requested data items relative to processes that require a PIR server to scan the database once for each requested data item. This also reduces the latency in responding to requests, which can be critical in implementations in which the servers are required to respond quickly, e.g., in milliseconds. For example, delays in providing digital components or associated data for display with web pages and/or other electronic resources can result in page load errors at the client device or cause portions of an electronic resource to remain unpopulated even after other portions of the resource are displayed at the client device. Also, as the delay in providing the digital component to the client device increases, it is more likely that the electronic resource will no longer be displayed at the client device when the digital component is delivered to the client device, thereby negatively impacting a user's experience with the electronic resource. Further, delays in providing the digital component can result in both a failed delivery of the digital component, for example, if the electronic resource is no longer displayed at the client device when the digital component is received, and wasted network bandwidth in attempting the failed delivery of the digital component.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a swim lane diagram of an example process for providing data in response to requests.

FIG. 4 is a block diagram of an example computer system.

Like reference numbers and designations in the various drawings indicate like elements.

DETAILED DESCRIPTION

In general, this document describes systems and techniques for preserving data security and data privacy in batch retrieval of information from multi-party computation (MPC) systems using PIR techniques. The cryptographic techniques enable an application, e.g., a web browser, to batch retrieve a large number of data items, e.g., key-value pairs, from one or more databases hosted in the same server or group of servers (e.g., group of servers in a secure MPC cluster), without weakening privacy protection or data security. For example, the cryptographic techniques prevent the servers and entities that fraudulently (or without authorization) obtains a request for data items and/or responses that include the data items from identifying the data items being requested, the values of the data items being returned, and/or the quantity of data items being requested or for which the values are returned. The batch retrieval also reduces the number of requests, e.g., Hypertext Transfer Protocol (HTTP) requests, sent from client devices, the quantity of responses sent to the client devices, and the associated bandwidth/battery consumption.

Figure 1:
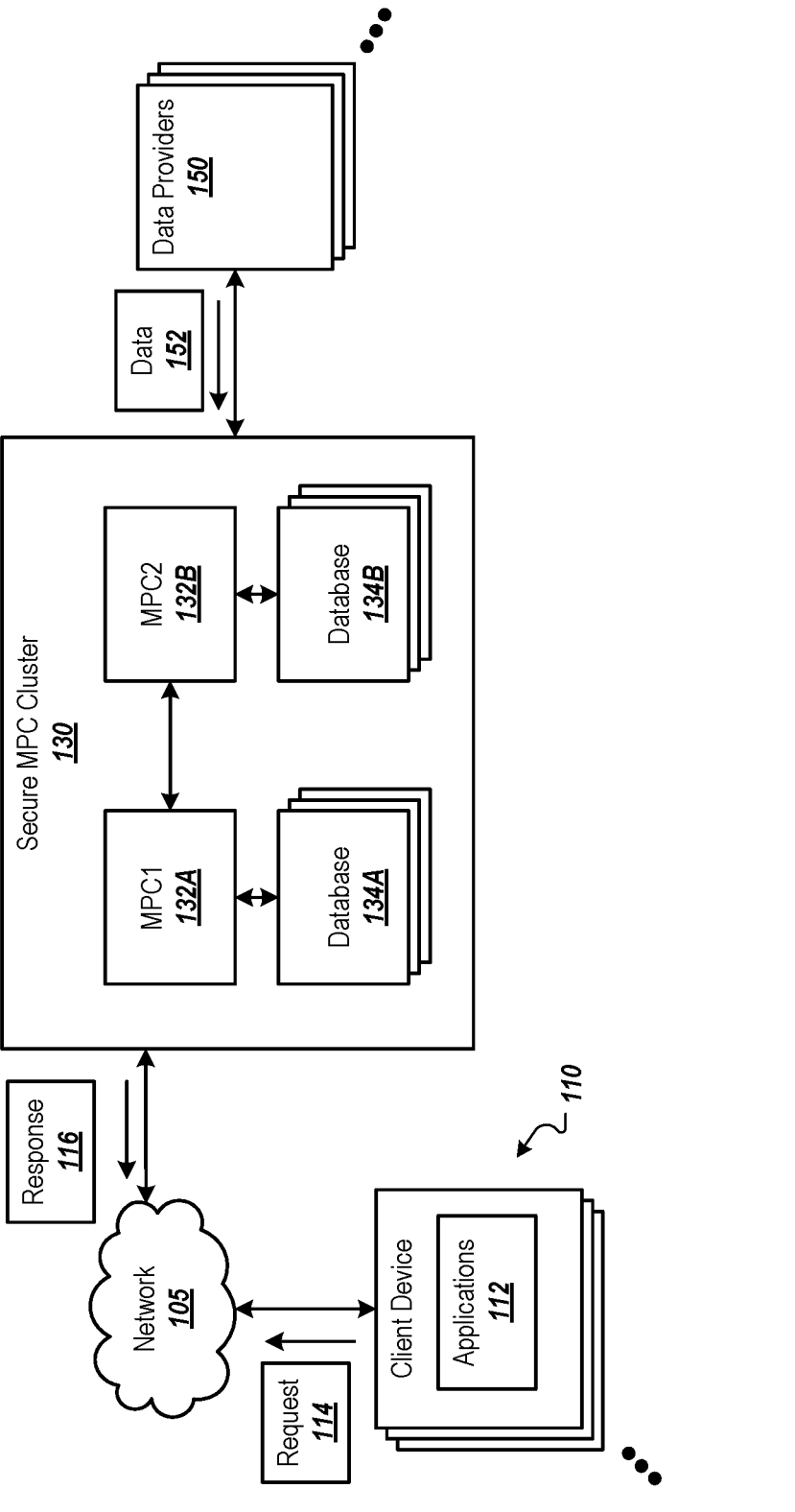
FIG. 1 is a block diagram of an example environment in which servers of an MPC cluster receive requests for data and provides data in response to the requests.

FIG. 1 is a block diagram of an example environment 100 in which servers of an MPC cluster 130 receive requests for data and provide data in response to the requests. The environment 100 includes a data communication network 105, such as a local area network (LAN), a wide area network (WAN), the Internet, a mobile network, or a combination thereof. The data communication network 105 connects client devices 110 to the servers of the secure MPC cluster 130, and can also connect data providers 150 to the servers of the MPC cluster 130.

A client device 110 is an electronic device that is capable of communicating over the network 105. Example client devices 110 include personal computers, server computers, mobile communication devices, e.g., smart phones and/or tablet computers, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming device, or a virtual reality system.

A gaming device is a device that enables a user to engage in gaming applications, for example, in which the user has control over one or more characters, avatars, or other rendered content displayed in the gaming application. A gaming device typically includes a computer processor, a memory device, and a controller interface (either physical or visually rendered) that enables user control over content rendered by the gaming application. The gaming device can store and execute the gaming application locally, or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

A client device 110 can include applications 112, such as web browsers and/or native applications, to facilitate the sending and receiving of data over the network 105. A native application is an application developed for a particular platform or a particular device (e.g., mobile devices having a particular operating system). The applications 112 can also include an application that selects content for display at the client device 110 based on data received from the MPC cluster 130. Optionally, an application 112, such as a web browser, can include modules or other code for selecting the content for display at the client device 110. As described in more detail below, an application 112 can request data from the MPC cluster 130 by sending a request 114 to the MPC cluster 130. Although operations may be described as being performed by the client device 110, such operations may be performed by an application 112 running on the client device 110.

The secure MPC cluster 130 includes two server computers, MPC1 132A and MPC2 132B, that are configured to perform secure MPC processes using 2-server PIR techniques to provide the values of data items that are responsive to requests received from client devices 110. Although the example MPC cluster 130 includes two MPC servers, more servers can also be used as long as the MPC cluster 130 includes more than one server. For example, the MPC cluster 130 can include three servers, four servers, or another appropriate quantity of servers.

The computing systems MPC1 and MPC2 can be operated by different entities. In this way, each entity may not have access to the data items requested by applications 112 or the quantity of items requested. For example, one of the servers MPC1 or MPC2 can be operated by a trusted party different from the data providers 150. For example, an industry group, governmental group, or browser developer may maintain and operate one of the servers MPC1 and MPC2. The other server may be operated by a different one of these groups, such that a different trusted party operates each server MPC1 and MPC2. Preferably, the different parties operating the different servers MPC1 and MPC2 have no incentive to collude to endanger data privacy. In some implementations, the servers MPC1 and MPC2 are separated architecturally and are monitored to not communicate with each other outside of performing the secure MPC processes described in this document.

MPC1 and MPC2 can each store one or more databases 134A and 134B, respectively. Each database 134A and 134B can store data items in the form of key-value pairs that each include a key that identifies the data item and a value of the data item. Each key is unique within a given database such that no two data items in a single database have the same key.

The databases 134A and 134B of each server MPC1 and MPC2 can be the same. That is, MPC1 can store the same databases as MPC2. Each database 134A and 134B can have an identifier that identifies the database, e.g., using a name or other appropriate identifier. For example, each database can store data of a particular category and the identifier for the database can be the category. The keys and values stored in each database 134A and 134B can be in cleartext, e.g., rather than ciphertext. Cleartext is text that is in unencrypted form, e.g., that is not computationally tagged, specially formatted, or written in code, or data, including binary files. That is, cleartext is in a form that can be viewed or used without requiring a key or other decryption device, or other decryption process.

The servers MPC1 and MPC2 can receive the databases 134A and 134B (or the data to be stored in the databases 134A and 134B from data providers 150. For example, each data provider 150 can provide data 152 that includes data items in the form of key-value pairs to MPC1 and MPC2.

An application 112 can request the values of data items from the secure MPC cluster 130 by submitting a request 114 to one or both servers MPC1 and/or MPC2. To prevent the servers MPC1 and MPC2 from being able to identify the data items for which the application is requesting values, the application 112 can use cryptographic techniques to encode keys for the requested data items and split the encoded keys into shares. The application 112 can then provide a share of the encoded keys to MPC1 and another share of the keys to MPC2. The shares can be secret shares or keys generated using distributed point functions, as described below. Keys generated using distributed point functions are also referred to as DPF keys to distinguish from keys of data items.

In some implementations, the application 112 encrypts the encoded keys for MPC2 using a public key of MPC2 and provides, to MPC1, a single request 114 that includes the encoded keys for MPC1 and the encrypted encoded keys for MPC2. MPC1 can then provide the encrypted encoded keys to MPC2. MPC2 can decrypt the encrypted encoded keys using its private key that corresponds to, e.g., that is mathematically linked to, the public key used to encrypt the encoded keys for MPC2. In this way, only a single request is sent to one of the servers (MPC1), while still preventing both servers MPC1 and MPC2 from having access to both shares of the encoded keys. This reduces the amount of bandwidth consumed in sending the request 114 over the network 105 while maintaining the data security and data privacy guarantees.

The servers MPC1 and MPC2 can perform a secure MPC process, e.g., a secure 2PC process, using the shares of the encoded keys to obtain respective shares of the requested values that correspond to the encoded keys and send, to the application 112, one or more responses 116 that include the shares of the requested values. In some implementations, each server MPC1 and MPC2 sends, to the application 112, a respective response 116 that includes its shares of the values. In some implementations, MPC1 sends a single response 116 that includes an obfuscated array of values that the application 112 can assemble into the actual response with the actual values. Example processes for providing data in response to requests are described below with reference to FIGS. 2 and 3.

In some implementations, the application 112 is configured to select between a batch process for requesting values of data items and individual processes for requesting values of data items. For example, the application 112 can select the batch process when the quantity of keys for which values are being requested satisfies a threshold, e.g., by meeting or exceeding the threshold. In an individual process, the application 112 can send a request to a single server with an individual key using a conventional single server PIR technique.

FIG. 2 is a swim lane diagram of an example process 200 for providing data in response to requests. Operations of the process 200 can be performed by servers of an MPC cluster, e.g., MPC1 and MPC2 of MPC cluster 130, an application running on a client device, e.g., application 112 running on client device 110, and computers of data providers, e.g., data providers 150. Operations of the process 200 can also be implemented as instructions stored on one or more computer readable media, which may be non-transitory, and execution of the instructions by one or more data processing apparatus can cause the one or more data processing apparatus to perform the operations of the process 200.

Data providers 150 provide data to server MPC1 of an MPC cluster (202). The data can include data items in the form of key-value pairs or in the form of a database or other appropriate data structure that includes key-value pairs. MPC1 can store the data locally in a database.

The data providers 150 provide data to another server MPC2 of the MPC cluster (204). The data can include data items in the form of key-value pairs or in the form of a database or other appropriate data structure that includes key-value pairs. MPC2 can store the data locally in a database. The data provided to MPC2 can be the same as the data provided to MPC1. The servers MPC1 and MPC2 can store the databases and respond to requests for values stored in the databases received from client devices.

In this example, each server MPC1 and MPC2 can store m databases, where m is any integer having a value of two or more. Each database i can include $n_i$ unique keys, where $0 \leq i < m$. Each key is unique within each database such that each key identifies one value within the database. Each value can be in the form of an opaque byte array. The maximum length of the byte array, e.g., in terms of quantity of bytes, for values in the i-th database is $s_i$. A byte array is an array of bytes of data and can include any type of data.

The application 112 determines to obtain values for data items stored in the databases hosted by the servers MPC1 and MPC2 (206). For example, the application 112 performing machine learning computations using a machine learning model may need values of data items for upcoming computations. In this example, the application 112 can identify the keys for the values that will be used in the upcoming computations.

In another example, the application 112 can identify an opportunity to display a digital component, e.g., within another electronic resource such as a web page, streaming video, etc. Some resources, application pages, streamlining video players, or other application content can include digital component slots for displaying digital components. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page, application content (e.g., an application page), or other resource displayed by the application 112. More specifically, the digital component may include digital content that is relevant to the resource content, e.g., the digital component may relate to the same topic as the web page content, or to a related topic. The provision of digital components can thus supplement, and generally enhance, the web page or application content.

In this example, the application 112 can request data for candidate digital components from the servers MPC1 and MPC2. The data for a digital component can include the digital component itself, e.g., in the form of a creative that includes an image, text, and/or video, and/or a resource locator or other reference that can be used to download the digital component from a network location, e.g., network server.

The data for a digital component can also include selection criteria for use in selecting the digital component for display at a client device. The selection criteria for a digital component can include a group identifier for each of one or more corresponding interest-based user groups for which the digital component is eligible for distribution. In this example, the digital component can be displayed to users that have assigned to at least one of the corresponding interest-based user groups, e.g., in response to the user being classified as having an interest in a topic corresponding to the interest-based user group. For example, a user that is determined to be interested in a set of topics can be assigned to the user groups corresponding to the topics. Each user group can be assigned a unique group identifier that is different from the group identifier of each other user group. The selection criteria can also include a selection value that represents an amount that a digital component provider is willing to provide in exchange for displaying the digital component, e.g., with resources related to the one or more corresponding topics.

The data for a digital component can be in the form of a byte array. In the databases stored and maintained by the servers MPC1 and MPC2, the keys can be group identifiers and the value for each key can be an aggregate data array that includes the data array for each digital component that includes the group identifier in its selection criteria. In this way, the application 112 can request digital components that are eligible to be displayed to a user of the application 112 based on the user's membership in user groups, e.g., based on the user being classified as being interested in topics of the user groups.

In this example, the data providers 150 can be the digital component providers. Each digital component provider can provide, to the servers MPC1 and MPC2, data arrays for digital components. For example, a digital component provider can provide a data array for each digital component along with the keys that identify the user groups for which the digital component is eligible. In another example, each digital component provider can provide a database that includes keys and values, where the value for each key includes a data array for each digital component that is eligible for distribution to users that are members of the user group corresponding to the key.

The application 112 determines to generate a batch request (208). The application 112 can determine whether to generate a batch request or one or more individual requests for individual data items based on a quantity of keys for which values are to be requested. For example, the application 112 can compare the quantity of requested keys to a threshold. If the quantity of requested keys satisfies the threshold, e.g., by meeting or exceeding the threshold, the application 112 generates a batch request. If not, the application 112 can send an individual request for each key, e.g., to a single PIR server.

The application 112 encodes keys into a byte array (210). When the application 112 determines to request data from the MPC cluster 130, the application 112 can identify the keys for the data to be requested from the MPC cluster 130 and encode the identified keys into a byte array. The identified keys can include any number of keys.

In some cases, a batch request can include keys for multiple databases. In such cases, the application 112 can generate a byte array for each database. In other words, the application 112 can split the request into sub-requests and generate a byte array for each sub-request, where each sub-request is for a different database.

Each byte array includes keys for key-value pairs stored by the MPC cluster 130. The byte array can be in the form of a probabilistic data structure. For example, the byte array can be in the form of a cuckoo filter that includes the keys or data representing the keys.

Encoding the keys enable each server MPC1 and MPC2 to scan an entire database once, yet still retrieve all the values for the keys encoded in the byte array without leaking any information to MPC1 or MPC2. The byte array is also a data structure that can be transmitted over a network concisely to MPC1 and/or MPC2 in way that reduces bandwidth consumption and latency in transmitting the keys.

The byte array for a request (or sub-request) can be configured in various ways. For example, there are scenarios in which a key can be placed in either one, two, three, or more possible locations in the byte array. The byte array for a request or sub-request can be referred to as a request byte array. Let k denote the quantity of possible locations, where $k \in \{1, 2, 3\}$. As described below, selecting the value of k properly enables the balancing of the server side processing cost and application bandwidth consumption, while still satisfying applicable data security and privacy requirements.

The request byte array can be configured such that each key can be placed in only one location in the request byte array, i.e., when k=1. This is possible by selecting a hash function that maps a key to $[0, z-1]$, where z is the size of the byte array—i.e., the number of locations in the byte array. To avoid hash collisions where multiple keys in the same batch retrieval for the same database are mapped to the same array location, the application 112 can be configured to use a perfect hash function technique in which the application 112 randomly or pseudorandomly selects hash function parameters until the application 112 finds the perfect hash function that works. A hash function that works is one that places each key in a unique location in the byte array. This process for finding the perfect hash function can be performed in polynomial time.

When the key can be placed in one of multiple locations, i.e., k>1, the byte array can be in the form of a cuckoo filter. To generate a cuckoo filter, the application 112 uses multiple hash functions to assign the keys to locations in the cuckoo filter. The application 112 can attempt to place a key into the cuckoo filter using the hash functions by applying the hash functions to the key. If at least one of the locations output by the hash function is empty, the application 112 can store the key in one of the empty locations. If the location output by all hash functions is occupied, the application 112 can select one of the locations and replace the value in that location with the key. The quantity of hash functions can equal the value of k.

Regardless of the value of k, the number of entries in the constructed byte array is proportional to the number of keys in the batch retrieval request. The ratio between the number of keys and the number of entries in the byte array can be referred to as the load factor. In general, while the value of k increases from 1 to 3 (or even larger), the maximum practical load factor increases to 90+%. In situations that require very strong privacy protection and/or data security, it may be desirable to prevent the servers MPC1 and MPC2 from learning the number of keys in a batch request. If so, the application 112 (or its developer) can define multiple permissible numbers of entries in the byte array. For each request, the application 112 can select, e.g., randomly or pseudorandomly, one permissible array size that is larger than the number of keys in the batch request. In such cases, the actual load factor decreases from the maximum practical load factor for the k value, which makes it more likely to successfully construct the perfect hash function or cuckoo filter with randomized algorithms in each attempt. When the load factor increases, the bandwidth required to transmit the request byte array reduces proportionally. However, it may take more attempts and longer time for the application 112 to construct the request byte array.

To further data privacy, the application 112 can be configured to select from multiple probabilistic data structure sizes and randomly pick one to prevent MPC from knowing the number of keys in request. That is, the application 112 can be configured to adjust the value of k for requests, e.g., periodically, for each request, randomly, etc.

Each item in a request byte array can be the key itself. However, doing so while requiring the servers MPC1 and MPC2 to perform secure multiple party equality tests between the keys in the database and the keys contained in the request byte array would require multiple roundtrip computations between MPC1 and MPC2. This can significantly increase the computational costs, e.g., the quantity of processor cycles, latency, and bandwidth consumption.

The application 112 splits each request byte array into shares (212). This prevents MPC1 and MPC2 from learning the keys in the request and reduces the computational costs, latency, and bandwidth consumption. The application 112 can split each request byte array into a respective share for each server MPC1 and MPC2. That is, in a 2PC implementation, the application 112 can split each request byte array into two shares, one for each server MPC1 and MPC2.

In some implementations, the application 112 splits each request byte array into secret shares using a secret sharing cryptographic technique. In this example, the application 112 can generate a first byte array that includes, for each key, a first secret share of the key in a particular location in the first byte array. The application 112 also generates a second byte array that includes, for each key, a second secret share of the key in the particular location of the second byte array. That is, the first secret share and the second secret share are in the same location in both byte arrays, which can be the same as the key's original location in the request byte array. The application 112 can generate the first byte array for MPC1 and the second byte array for MPC2.

In some implementations, the application 112 splits each request array using distributed point functions. Distributed point functions are cryptographic techniques that enable multiple distributed processes to perform operations on shared information without revealing the information to either party. In this example, the application 112 can use a distributed point function to generate two DPF keys for the item stored in each location of the request data array. That is, the application 112 generates two DPF keys for each requested key, one for each server MPC1 and MPC2.

The application 112 (or another entity, such as the developer of the application 112) and/or the MPC cluster 130 (or the parties that run the MPC cluster 130) can generate, as the distributed point functions, a generation function (DPF.Gen) and an evaluation function (DPF.Eval) such that, given an input x, the function DPF.Gen returns a key pair $(k_0, k_1)$ and DPF.Eval$(k_0, i)$ XOR DPF.Eval$(k_1, i)$=$(x==i)$. As used throughout this document, "XOR" refers to a bitwise XOR operation function values and "==" represents an equality check to check whether two operands are equal. Thus, the bitwise XOR of DPF.Eval$(k_0, i)$ with DPF.Eval$(k_1, i)$ can be used to determine whether an item i matches the input x. That is, DPF.Gen generates a DPF key pair $(k_0, k_1)$ for an input x and DPF.Eval is used to evaluate whether an item i matches the input x using the DPF key pair $(k_0, k_1)$ rather than the input x. In this way, no entity can infer the input x from $k_0$ alone without access to $k_1$, or vice versa.

The application 112 can generate the two DPF keys for each location in the request byte array using the generation function (DPF.Gen). In doing so, the application 112 generates a DPF key pair for each requested key and possibly some random keys in the request byte array depending on the size of the byte array relative to the quantity of requested keys. For example, if the byte array has 120 positions "p" and 100 keys are being requested, the application 112 would generate DPF keys for 100 requested keys and 20 random keys. In this way, neither MPC1 nor MPC2 would on its own be able to distinguish genuine keys for retrieval purposes from random keys that are used to fill in the gaps of the request byte array.

For a given requested key in the request byte array, the application 112 can compute DPF.Gen(key)=$(k_0, k_1)$, where $k_0$ is a first DPF key for the given requested key and $k_1$ is a second DPF key for the given requested key. The application 112 can generate a first byte array that includes the first DPF key for each requested key and a second byte array that includes the second DPF key for each requested key. In this way, no party that has only one of the two byte arrays can obtain the values of the requested keys, thereby preserving data privacy and data security.

In some implementations, the DPF keys are 12×z bytes each, where z is the bit length of a requested key. If the application 112 is requesting n keys of z-bits each, the application 112 can send n×2×12×z bytes, plus any additional data such as database identifiers. For example, to send a batch request for 100 keys of 24 bits each, the application 112 can send 56.2 kilobytes (KBs) to MPC1 if binary encoding is used, or 75 KBs in web safe Base64 encoding.

The application 112 sends a batch request to MPC1 (214). The batch request can include the first byte array and the second byte array for each sub-request. To prevent MPC1 from accessing the second byte array(s), the application 112 can encrypt each second byte array using an encryption key, e.g., a public key, of MPC2. In this way, only MPC2 can decrypt the second byte arrays using a decryption key, e.g., private key, corresponding to the public key. MPC1 can send the encrypted second byte arrays to MPC2. MPC2 can then decrypt the encrypted second byte arrays using its decryption key.

In some implementations, the application 112 sends, to MPC1, a first batch request that includes the first byte array(s). The application 112 also sends, to MPC2, a second batch request that includes the second byte arrays.

In either implementation, the batch request can include data identifying the database corresponding to each byte array. As described above, each sub-request and therefore each pair of byte arrays can query a particular database stored by MPC1 and MPC2. Including the data identifying the database for each byte array enables MPC1 and MPC2 to query the appropriate database.

MPC1 and MPC2 process the batch request (216). MPC1 and MPC2 process each sub-request of the batch request to obtain data representing values of the requested keys for each sub-request. However, since the values of the requested keys can be confidential information, neither server MPC1 nor MPC2 obtains the value of any requested key in cleartext. MPC1 and MPC2 can process each sub-request against the database corresponding to the subrequest, e.g., by identifying the database by the database identifier for the sub-request.

Each key in a database (also referred to as database key) can be in one of k locations in a request byte array, e.g., in one of the k locations of the first byte array and the second byte array corresponding to the sub-request. The k locations are defined by hash functions {$hash_0, \ldots hash_{k-1}$} used to generate the request byte array. MPC1 and MPC2 can determine the k possible locations for each database key by evaluating the hash function(s) using the value of the database key.

The database key is specified by the batch request, i.e., the key is a requested key, if DPF.Eval$(k_0, i)$ XOR DPF.Eval$(k_1, i)$ is TRUE for any $i \in [0, k-1]$, where $(k_0, k_1)$=DPF.GEN (key) and DPF.Gen and DFP.Eval is in one of the array locations {$hash_0(key), \ldots hash_{k-1}(key)$}. In these relationships, the item i represents a requested key in one of the array locations between array location 0 and k-1 in the two byte arrays. Thus, the database key is a requested key when the XOR of the evaluation functions applied to (i) the key pair $(k_0, k_1)$ generated for the database key and (ii) the value of a requested key is TRUE.

The application of perfect hash (for k=1) and cuckoo filter (for k>1) serves at least two purposes. This reduces the quantity of DPF.Gen and DPF.Eval invocations from p (i.e., the quantity of locations in the request byte array) to k, where k<<p, which reduces the computation resource, e.g., processor cycles, required to process the batch request and reduces the latency in providing results of the batch request.

When combined by information theoretic PIR, MPC1 and MPC2 collectively return the values corresponding to the requested keys in the same order that the keys appear in the request byte array.

To prevent MPC1 and MPC2 from gaining access to which keys are requested, MPC1 and MPC2 can perform this evaluation for each key in the database using a secure MPC process. The result of this secure MPC process is MPC1 having, for each database key, a first secret share of matching data that represents whether the database key is in each one of the k possible locations in the request byte array. That is, for each of the k possible locations that the database key could be found in the request byte array, MPC1 has a first secret share of matching data that represents whether the database key is in that location. Similarly, for each of the k possible locations that the database key could be found in the request byte array, MPC2 has a second secret share of matching data that represents whether the database key is in that location.

For each database key, MPC1 and MPC2 each computes the k locations in the request byte array where the database key can be found. For each of the k locations, MPC1 computes $DPF.Eval(k_0, key)$ from the first byte array to get a value of zero or one, where $k_0$ is the key in the current location being evaluated and key is the database key. This results in a first XOR secret share of whether the MPC cluster 130 should return the database value corresponding to the database key in the specific array location in the PIR response, e.g., whether (key, value) is in the database. If the value is one, MPC1 will XOR the value with the existing value in the specific array location in the PIR response. If the value is zero, MPC1 will skip the XOR for this specific array location.

Similarly, for each of the k locations, MPC2 computes $DPF.Eval(k_1, key)$ from the first byte array to get a value of zero or one, where k1 is the key in the current location being evaluated and key is the database key. This results is a second XOR secret share of whether the MPC cluster 130 should return the database value corresponding to the database key in the specific array location in the PIR response, e.g., whether (key, value) is in the database. If the value is one, MPC2 will XOR the value with the existing value in the specific array location in the PIR response. If the value is zero, MPC2 will skip the XOR for this specific array location.

MPC1 and MPC2 can then use PIR batch retrieval process to generate respective results "result1" and "result2" that represent the values of each requested key in the database based on these secret shares. The results can be in the form of byte arrays, e.g., having the same size and structure as the request byte array, and can be referred to as result byte arrays.

The two request byte arrays and the two result byte arrays (result1 and result2) in the response have the same length. The i-th entries in the two result byte arrays are the XOR secret shares of the database value corresponding to the requested key, or zero if that entry was a random key.

To generate the result byte arrays, for each location in the request byte array, MPC1 collects all the database keys whose DPF functions are evaluated to TRUE for the value (e.g., requested key or empty value) stored in that array location. MPC1 selects all keys that can be hashed to a specific location and $DPF.Eval(k_0, key)==TRUE$, where $k_0$ is the requested key deposited into the location of the first byte array by the application 112. MPC1 can compute a bitwise XOR of the values stored in the database for each database key that can be hashed to the array location and the corresponding DPF function is evaluated to TRUE for that array location. As each value is a byte array, the result of this XOR operation is a byte array. This resultant byte array is MPC1's result for that location in the request byte array. MPC1 can store this result in the same location of result1 as the location in the request byte array being evaluated. That is, for the first location in the request byte array, MPC1 can store the resultant byte array of the XOR operation in the first location of result1. MPC1 can perform this process for each location in the request byte array to populate result1 with the XOR result of database values corresponding to each requested key. MPC2 also performs the same process for each location in the request byte array for populate result2 with the XOR result of database values corresponding to each requested key of the second byte array.

In some implementations, MPC1 sends result1 to the application 112 and MPC2 sends result2 to the application 112. To reduce bandwidth consumption, MPC2 can send a garbled response to MPC1 (218). In this way, only MPC1 sends a response to the application 112, which reduces the client device bandwidth consumption. The garbled response can be an obfuscated version of result2, e.g., using a mask, such that MPC1 cannot access result2 in cleartext.

In implementations that use the garbled response, the application 112 can select a nonce, e.g., randomly or pseudorandomly, for each batch request. The application 112 can send the nonce to one of the servers MPC1 or MPC2. In this example, the application 112 sends the nonce to MPC2. The application 112 and MPC2 independently compute a cryptographic mask using the same algorithm and input nonce for each location in the request array. In this example, the i-th bit of the mask for the j-th location in the byte array is PRF(nonce, i, j), where PRF represents a cryptographic pseudorandom function performed on the nonce, i, and j. The mask size is the same as the longest value in the database. Both the application 112 and MPC2 keep the nonce and mask strictly confidential from MPC1 or any other entity. To send the values of the database for the requested keys, MPC2 sends, as a garbled response, the result of a bitwise XOR between each array element in result2 and the corresponding mask, i.e., result2[j] XOR mask[j], to MPC1.

MPC1 sends a response representing the values of the requested keys (220). As described above, MPC1 can send response1 to the application 112 and MPC2 can send response2 to the application 112. If a garbled response is used, MPC1 can instead send the result of a bitwise XOR between each array element in result1 and the corresponding array element in the garbled response, i.e., result1[j] XOR (result2[j] XOR mask).

The application 112 assembles the actual response (222). The actual response includes the actual database value for each requested key of each sub-request of the batch request. If the database values are byte arrays for digital components and the requested keys are user group identifiers, the actual response would include, for each requested user group identifier, the byte array for each digital component that includes in its selection criteria, the requested user group identifier. That is, if location 1 of the request byte array included the key (e.g., in the form of DPK keys in two byte arrays) for user group A, the actual response for location 1 would include the byte array for each digital component in the database that is eligible for distribution to users in user group A (e.g., each digital component that includes user group A in its selection criteria).

If the application 112 receives result1 from MPC1 and result2 from MPC2, the application can assemble the actual response by determining the bitwise XOR of result1 and result2 element-wise, i.e. for each corresponding location in the result1 array and result2 array. This results in an array that includes, in each location, the database value (or byte array of all Os if the requested key doesn't exist in the database) corresponding to the requested key whose DPF keys are stored in that location in the request array.

If a garbled response is used, the application 112 can compute a bitwise XOR between the result received from MPC1 and the mask computed by the application 112, i.e., result1 XOR (result2 XOR mask) XOR mask. Mathematically, this is equivalent to result1 XOR result2. These XOR operations are between arrays of equal length. Each of the elements in each array is a byte array.

The application 112 converts the actual response (224). The application 112 can convert the actual response into a format or data structure that can be used for further processing. For example, the application 112 can convert the actual response into JavaScript Object Notation (JSON) format that is easily consumable by scripts, worklets, or other types of code, modules, or engines. In a particular example, the application 112 can convert the actual response into a JSON file that identifies the digital components eligible for each user group and the selection criteria and/or other data for the digital component received from MPC1 and MPC2.

The application 112 performs an action based on the actual response (226). The application 112 can use the data obtained from the database(s) to perform a variety of functions. In an example in which digital components are requested, the application 112 can select a digital component and display the digital component. For example, the application 112 can use the selection criteria for the digital components of the actual response to select the digital component.

Figure 3:
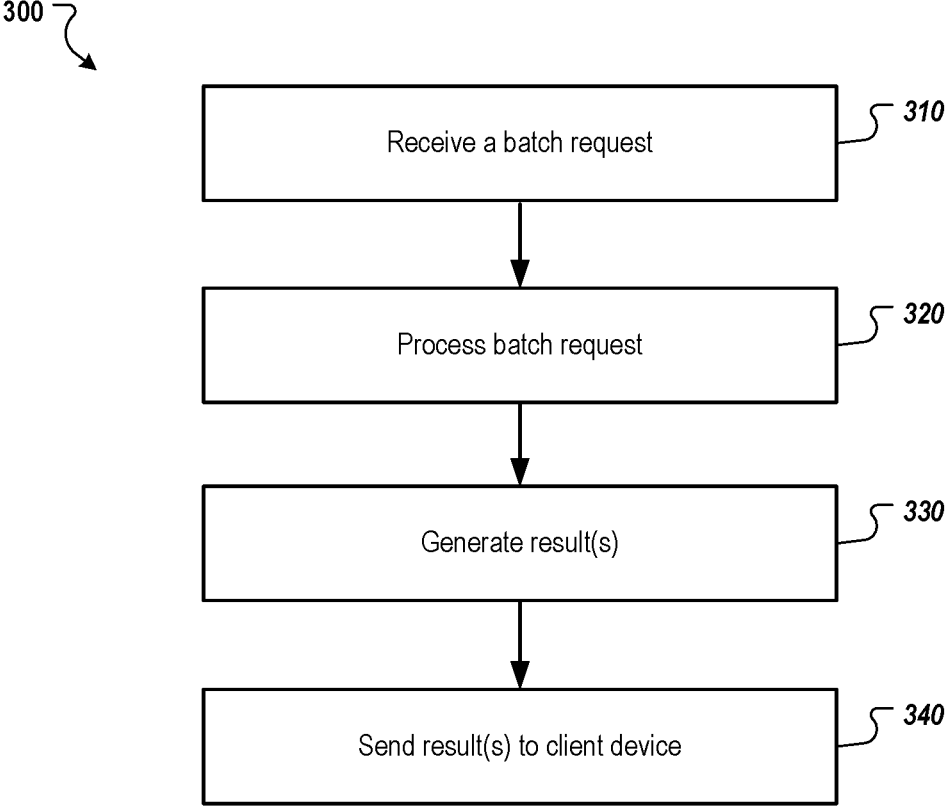
FIG. 3 is a flow diagram of an example process for providing data in response to requests.

FIG. 3 is a flow diagram of an example process 300 for providing data in response to requests. Operations of the process 300 can be performed by servers of an MPC cluster, e.g., MPC1 and MPC2 of MPC cluster 130, an application running on a client device, e.g., application 112 running on client device 110, and computers of data providers, e.g., data providers 150. Operations of the process 300 can also be implemented as instructions stored on one or more computer readable media, which may be non-transitory, and execution of the instructions by one or more data processing apparatus can cause the one or more data processing apparatus to perform the operations of the process 300.

A batch request is received (310). A client device can send the batch request to a first MPC server, e.g., MPC1, of an MPC cluster. The batch request can include a first array whose values are byte arrays and optionally an encrypted second byte array. An array of byte arrays can be encoded into a single byte array. The first byte array can include, for each requested key of multiple requested keys, a first secret share of the requested key. If MPC1 receives the encrypted second byte array, MPC1 can send the encrypted second byte array to a second MPC server, e.g., MPC2. MPC2 can decrypt the second byte array. In another example, the client device can send the second byte array to MPC2. In either example, the second byte array can include, for each requested key of the multiple requested keys, a second secret share of the requested key.

The first MPC server (MPC1) processes the batch request by processing each database key to generate first secret shares of matching data indicating whether the database key matches at least one requested key of the multiple requested keys (320). MPC1 can process the batch request in collaboration with MPC2 using a secure MPC process. For example, MPC1 and MPC2 can process the batch request as described above with reference to operations 216 and 218 of FIG. 2 to generate XOR secret shares that represent whether the database key matches a requested key. The XOR secret shares generated by MPC1 can be referred to as first secret shares of the matching data and the XOR secret shares generated by MPC2 can be referred to as second secret shares of the matching data.

The first MPC server (MPC1) uses each first secret share of the matching data for each database key to generate one or more results that represent database values corresponding to each database key that matches at least one requested key of the plurality of requested keys (330). As described above with reference to operation 216 of FIG. 2, MPC1 and MPC2 can generate results "result1" and "result 2," respectively, that represent values of each requested key in the database.

The first MPC server (MPC1) sends the one or more results to the client device (340). For example, MPC1 can send result1 to the client device and MPC2 can send result2 to the client device. In another example, MPC2 can encrypt result2 using an encryption key for which the client device has a decryption key. MPC2 can then send result2 to MPC1 and MPC1 can send result1 and encrypted result2 to the client device. The client device can then combine the results, as described above with reference to operation 226 of FIG. 2, to obtain the database values in cleartext.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
   receiving, from a client device and by a first multi-party computation (MPC) server of a cluster of MPC servers, a batch request for retrieving multiple database values stored in one or more databases, the batch request comprising a first byte array that includes, for each requested key of a plurality of requested keys, a first secret share of the requested key, wherein each database comprises a plurality of data items that each include a database key and a corresponding value;

processing, by the first MPC server in collaboration with one or more second MPC servers of the cluster of MPC servers, each database key to generate first secret shares of matching data indicating whether the database key matches at least one requested key of the plurality of requested keys, wherein the processing comprises, for each database key, identifying one or more locations in the first byte array corresponding to the database key and evaluating whether data representing the database key is in the one or more locations;
   generating, by the first MPC server in collaboration with the one or more second MPC servers, using each first secret share of the matching data for each database key, one or more results that represent database values corresponding to each database key that matches at least one requested key of the plurality of requested keys; and
   sending the one or more results to the client device.

2. The computer-implemented method of claim 1, wherein each second MPC server of the cluster receives a respective second byte array that includes, for each requested key of the plurality of requested keys, a respective second secret share of the requested key.

3. The computer-implemented method of claim 2, wherein the first MPC server and the one or more second MPC servers collaboratively perform secure MPC operations to generate the one or more results that represent the database values corresponding to each database key that matches the at least one requested key and one or more additional results that represent the database values corresponding to each database key that matches the at least one requested key, wherein each second MPC server sends the one or more additional results to the client device.

4. The computer-implemented method of claim 2, wherein:
   the first secret share of each requested key comprises a first distributed point function key generated by the client device using a generation function of a distributed point function; and
   each respective second secret share of each requested key comprises a respective second distributed point function key generated by the client device using the generation function of the distributed point function.

5. The computer-implemented method of claim 4, wherein processing, by the first MPC server in collaboration with one or more second MPC servers of the cluster of MPC servers, each database key to generate first secret shares of matching data indicating whether the database key matches at least one requested key of the plurality of requested keys comprises for each database key:
   identifying each potential location for the database key in the first byte array; and
   for each potential location, determining a respective first secret share of the matching data using an evaluation function of the distributed point function.

6. The computer-implemented method of claim 1, wherein generating, by the first MPC server in collaboration with the one or more second MPC servers, using each first secret share of the matching data for each database key, one or more results that represent database values corresponding to each database key that matches at least one requested key of the plurality of requested keys comprises:
   for each potential location for each database key:
      determining whether the respective first secret share of the matching data has a value of one; and
      in response to determining that the respective first secret share of the matching data has a value of one, determining, as a first secret share of a database value for the potential location, a result of an XOR operation between the respective first secret share of the matching data and an existing value in the potential location of the first byte array.

7. The computer-implemented method of claim 1, wherein generating the one or more results comprises generating a first result that includes a first result byte array that includes, for each requested key of the plurality of requested keys that exists in the database, a corresponding byte array that represents a value for the requested key.

8. The computer-implemented method of claim 7, wherein the first result includes, for each requested key of the plurality of requested keys that is not found in the database, a value of zero.

9. The computer-implemented method of claim 8, wherein generating the one or more results comprises receiving, from each second MPC server of the cluster of MPC servers, a garbled response that represents a result of a bitwise XOR operation performed on a second result byte array and a mask, wherein the second result byte array includes, for each requested key of the plurality of requested keys, a corresponding byte array that represents a value for the requested key.

10. The computer-implemented method of claim 9, wherein generating the one or more results comprises computing a bitwise XOR operation on the first result byte array and the garbled response.

11. The computer-implemented method of claim 9, wherein the mask is generated by the client device and the first MPC server using a cryptographic algorithm and an input nonce for each location in the first byte array.

12. A system comprising:

one or more processors; and one or more storage devices storing instructions that, when executed by the one or more processors, cause the one or more processors to perform operations comprising:

receiving, from a client device and by a first multi-party computation (MPC) server of a cluster of MPC servers, a batch request for retrieving multiple database values stored in one or more databases, the batch request comprising a first byte array that includes, for each requested key of a plurality of requested keys, a first secret share of the requested key, wherein each database comprises a plurality of data items that each include a database key and a corresponding value;

processing, by the first MPC server in collaboration with one or more second MPC servers of the cluster of MPC servers, each database key to generate first secret shares of matching data indicating whether the database key matches at least one requested key of the plurality of requested keys, wherein the processing comprises, for each database key, identifying one or more locations in the first byte array corresponding to the database key and evaluating whether data representing the database key is in the one or more locations;

generating, by the first MPC server in collaboration with the one or more second MPC servers, using each first secret share of the matching data for each database key, one or more results that represent database values corresponding to each database key that matches at least one requested key of the plurality of requested keys; and sending the one or more results to the client device.

13. The system of claim 12, wherein each second MPC server of the cluster receives a respective second byte array that includes, for each requested key of the plurality of requested keys, a respective second secret share of the requested key.

14. The system of claim 13, wherein the first MPC server and the one or more second MPC servers collaboratively perform secure MPC operations to generate the one or more results that represent the database values corresponding to each database key that matches the at least one requested key and one or more additional results that represent the database values corresponding to each database key that matches the at least one requested key, wherein each second MPC server sends the one or more additional results to the client device.

15. The system of claim 13, wherein:

the first secret share of each requested key comprises a first distributed point function key generated by the client device using a generation function of a distributed point function; and each respective second secret share of each requested key comprises a respective second distributed point function key generated by the client device using the generation function of the distributed point function.

16. The system of claim 15, wherein processing, by the first MPC server in collaboration with one or more second MPC servers of the cluster of MPC servers, each database key to generate first secret shares of matching data indicating whether the database key matches at least one requested key of the plurality of requested keys comprises for each database key:

identifying each potential location for the database key in the first byte array; and for each potential location, determining a respective first secret share of the matching data using an evaluation function of the distributed point function.

17. The system of claim 12, wherein generating, by the first MPC server in collaboration with the one or more second MPC servers, using each first secret share of the matching data for each database key, one or more results that represent database values corresponding to each database key that matches at least one requested key of the plurality of requested keys comprises:

for each potential location for each database key:

determining whether the respective first secret share of the matching data has a value of one; and in response to determining that the respective first secret share of the matching data has a value of one, determining, as a first secret share of a database value for the potential location, a result of an XOR operation between the respective first secret share of the matching data and an existing value in the potential location of the first byte array.

18. The system of claim 12, wherein:

generating the one or more results comprises generating a first result that includes a first result byte array that includes, for each requested key of the plurality of requested keys that exists in the database, a corresponding byte array that represents a value for the requested key; and the first result includes, for each requested key of the plurality of requested keys that is not found in the database, a value of zero.

19. A non-transitory computer readable medium carrying instructions that, when executed by one or more processors of a first multi-party computation (MPC) server of a cluster of MPC servers, cause the one or more processors to perform operations comprising:

receiving, from a client device and by a first multi-party computation (MPC) server of a cluster of MPC servers, a batch request for retrieving multiple database values stored in one or more databases, the batch request comprising a first byte array that includes, for each requested key of a plurality of requested keys, a first secret share of the requested key, wherein each database comprises a plurality of data items that each include a database key and a corresponding value;

processing, by the first MPC server in collaboration with one or more second MPC servers of the cluster of MPC servers, each database key to generate first secret shares of matching data indicating whether the database key matches at least one requested key of the plurality of requested keys, wherein the processing comprises, for each database key, identifying one or more locations in the first byte array corresponding to the database key and evaluating whether data representing the database key is in the one or more locations;

generating, by the first MPC server in collaboration with the one or more second MPC servers, using each first secret share of the matching data for each database key, one or more results that represent database values corresponding to each database key that matches at least one requested key of the plurality of requested keys; and sending the one or more results to the client device.

20. The computer-implemented method of claim 1, wherein:

generating the one or more results comprises generating a first result that includes a first result byte array that includes, for each requested key of the plurality of requested keys that exists in the database, a corresponding byte array that represents a value for the requested key; and the first result includes, for each requested key of the plurality of requested keys that is not found in the database, a same value.

* * * * *